United States Patent Office

3,016,287
Patented Jan. 9, 1962

3,016,287
PROCESS OF SEPARATING LACTAMS
Thomas R. Hopkins, Johnson County, and William C. Francis, Mission, Kans., assignors to Spencer Chemical Company, Kansas City, Mo., a corporation of Missouri
No Drawing. Filed Sept. 23, 1958, Ser. No. 762,702
16 Claims. (Cl. 23—166)

This invention relates to the production of lactams. More particularly, this invention is concerned with a novel process of separating lactam from acidic rearrangement catalyst media resulting from the Beckmann rearrangement of alicyclic oximes.

The production of lactams by the Beckmann rearrangement of alicyclic oximes such as cyclopentanone oxime and cyclohexanone oxime in the presence of acid catalysts is well known in the art. This type of reaction is of practical significance since the lactams obtained have important practical uses. For example, epsilon-caprolactam obtained by the rearrangement of cyclohexanone oxime is the monomer of the commercially important polyamide known as nylon-6.

A wide variety of acidic catalysts are suitable for effecting the Beckmann rearrangement of alicyclic oximes including concentrated sulfuric acid or oleum, anhydrous hydrogen chloride, thionyl chloride, polyphosphoric acid, boron trifluoride, phosphorus oxychloride, phosphorus trichloride and phosphorus pentachloride. The most commonly used of the acid catalysts is sulfuric acid or oleum.

After the rearrangement of the oxime is completed it is conventional to neutralize the acidic catalyst with an aqueous base, such as ammonium hydroxide, and then separate the lactam by extraction with an inert immiscible solvent followed by evaporation or distillation of the extract to remove the solvent and isolate the lactam. This procedure requires the use of relatively large volumes of aqueous ammonium hydroxide and necessitates the subsequent use of large amounts of heat to evaporate or concentrate the aqueous layer to recover the ammonium salt of the acidic catalyst. Furthermore, when sulfuric acid is the catalyst ammonium sulfate is obtained which is a low priced material in excess supply on the market.

There is provided by this invention an improved method for working up lactam and rearrangement catalyst mixtures resulting from the Beckmann rearrangement of alicyclic oximes. There is also provided an improved medium from which the lactam may be readily separated and which medium may be subsequently utilized to obtain valuable commercial chemicals or which may be converted further to other valuable commercial chemicals. There is also provided an improved process for treating the reaction mixture obtained from a Beckmann rearrangement of alicyclic oximes which does not require the utilization of a large volume of ammonium hydroxide for neutralization of the rearrangement mixture. This invention further provides a process for treating Beckmann rearrangement product mixtures which results in valuable commercial chemicals as by-products.

The improved method of working up Beckmann rearrangement product mixtures which is provided by this invention comprises treating the mixture with urea to form a mixture of lactam and reaction products of urea with the rearrangement catalyst. In the case of simple protonic acids, such as sulfuric acid, the reaction products will be simple urea salts of the acid catalyst under normal conditions. With catalysts such as $PCl_3$, $SOCl_2$ and $PCl_5$ the urea forms reaction products and not simple salts. The lactam may then be readily separated from the urea salt or catalyst reaction product by suitable means such as extraction with a suitable solvent, or the lactam may be separated directly from the mixture by distillation under reduced pressure. Alternatively, the urea salt or reaction product of the catalyst may be converted to other commercially useful products prior to the separation of the lactam.

The urea is added to the rearrangement product mixture in an amount which will permit separation of the lactam. In the case of acidic catalysts, sufficient urea is added to partially or completely neutralize the catalyst. With other catalysts such as $PCl_3$ and the like, enough urea is generally added to react with part or all of the catalyst. The urea may be added as a solution in solvents such as water although it is far more advantageous to add the urea to the reaction medium in solid form. In general, urea is added in a ratio of at least one mole per mole of rearrangement catalyst.

When sulfuric acid or oleum is used as the rearrangement catalyst, urea is advisably added to the lactam-sulfuric acid reaction mixture in amounts corresponding to about 1 to about 2.4 or more moles of urea for each mole of sulfuric acid. The preferred range of urea is an amount of about 1.5 to about 2 moles of urea per mole of sulfuric acid. When one mole of urea is added, the urea combines with the sulfuric acid to form urea bisulfate. When two moles of urea are used, urea sulfate is formed. When between one and two moles of urea are added, there results a mixture of urea bisulfate and urea sulfate. The lactam may be readily separated from either the urea bisulfate or the urea sulfate. It has been found that amounts of urea in excess of two moles are not detrimental to the separation of the lactam, but generally the addition of amounts of more than about 2.5 moles of urea per mole of sulfuric acid are economically unjustifiable. Of course, it is obvious to one skilled in the art that less than one mole of urea may be added and would, to some extent, facilitate the separation of the lactam from the reaction mixture by conventional procedures.

When polyphosphoric acid is used as the rearrangement catalyst, urea is added to the product mixture in ratios of about 1 to about 2 or more moles of urea for each mole equivalent of $P_2O_5$.

The lactam may be separated from its mixture with the urea salt by distillation under reduced pressure but the preferred method of isolation is by extraction with a suitable solvent which is inert to the urea salts. Organic solvents such as dioxane, the chlorinated hydrocarbons such as chloroform, and hydrocarbons such as n-hexane and benzene are examples of suitable solvents.

The urea may be added to the rearrangement product mixture at any temperature which is not detrimental to the stability of the lactam. This can be as low as below room temperature to as high as about 150° C., depending upon the rearrangement catalyst used. For example, with sulfuric acid as the acid catalyst, it has been found preferable to add the urea to the mixture at about 60–80° C. in which temperature range the mixture is more easily stirred, thus providing a homogeneous mixture.

The process provided by this invention is suitable for working up Beckmann rearrangement product mixtures obtained by the use of the acid catalyst as the rearrangement medium and in the presence of other constituents such as solvents or dispersants, which are preferably inert to the urea at the temperature of addition.

After removal of the lactam from sulfuric acid or oleum rearrangement mixtures, the residue containing the urea salt of sulfuric acid may be treated with sulfur trioxide to convert it to sulfamic acid. Sulfamic acid and its ammonium salt are valuable agricultural chemicals especially useful as herbicides or defoliants. Alternatively, the mixture of lactam and urea salts of sulfuric acid may be treated with sulfur trioxide prior to the separation of the lactam, converting the urea salts of sulfuric acid to sulfamic acid. The lactam may then be separated from the mixture by distillation or extraction after neutralization of the sulfamic acid.

The following examples serve to further illustrate specific embodiments of the invention, but it should be understood that they should not serve to limit the invention.

EXAMPLE 1

The rearrangement of 28.2 g. (0.25 mole) of cyclohexanone oxime was carried out by adding it portionwise to 51 g. (0.5 mole) of 96% sulfuric acid while stirring and heating at about 90–95° C. The resulting mixture was divided into three equal portions. To each ⅓ was added a calculated amount of urea while stirring and heating at about 60° C. until a homogenous mixture was obtained. Each mixture was then extracted with successive portions of refluxing chloroform. The crude caprolactam was isolated by distillation of the solvent from the combined extracts. As shown in Table I, the amounts of urea used, based on $H_2SO_4$, were 1.3, 1.6, and 1.9 moles respectively.

Table I

| Mole Ratio, Urea/$H_2SO_4$ | Crude Caprolactam | | |
|---|---|---|---|
| | Weight (g.) | Yield (percent) | Melting Point (° C.) |
| 1.3 | 4.9 | 52 | 60–65 |
| 1.6 | 9.1 | 96.8 | 61–62 |
| 1.9 | 9.4 | 100 | 62–65 |

The crude caprolactam is purified by recrystallization from a suitable solvent such as n-hexane.

EXAMPLE 2

In a similar reaction in which urea was added to the rearrangement mixture to give a urea/$H_2SO_4$ ratio of 1.2/1, a 57% yield of crude caprolactam was obtained.

EXAMPLE 3

A mixture of 96% sulfuric acid (18 g.; 0.18 mole), urea (26 g.; 0.44 mole), and caprolactam (10 g.; 0.089 mole) was prepared at a temperature of 120–125° C. Extraction at room temperature with several portions of chloroform yielded 5.0 g. (50%) of caprolactam, M.P. 68–71° C.

EXAMPLE 4

A solution of 5 g. (0.044 mole) of caprolactam in excess concentrated sulfuric acid (0.088 mole) was prepared at 125° C. The solution was cooled to 45° C. and 5.2 g. (0.088 mole) of urea added. The mixture was then distilled at 110–155° C./2–3 mm. Hg to yield 4.8 g. (96% recovery) of caprolactam as crystalline distillate, M.P. 66–68° C.

EXAMPLE 5

Rearrangement of 28.2 g. (0.25 mole) of cyclohexanone oxime was effected by slow addition, with stirring, to 51 g. (0.5 mole) of 96% sulfuric acid which had been heated to 90° C. During addition of the oxime, no external heating was required to maintain this temperature. The reaction mixture was divided into two equal portions.

The first portion of the mixture was neutralized with cold concentrated ammonium hydroxide. Chloroform extraction of the basic solution yielded 13.5 g. (96%) of caprolactam, M.P. 68–70° C.

To the second portion of the mixture was added 0.61 mole of urea while heating and stirring at 60° C. (mole ratio urea/$H_2SO_4$=2.4/1). Extraction with successive portions of refluxing chloroform yielded 13.8 g. (97.8%) of caprolactam, M.P. 66–68° C.

The extracted residue was heated under vacuum to remove residual chloroform, and was then mixed with 25.5 g. of concentrated sulfuric acid to form urea bisulfate. The heated mixture (60° C.) was added dropwise to 90 ml. (2.1 moles) of liquid sulfur trioxide while stirring and allowing to reflux (45° C.) from the heat of reaction. When the addition was completed, excess sulfur trioxide was allowed to distill from the reaction mixture, and the residue was gradually heated to 125° C. Vacuum was applied during the final stages of heating. The white crystalline residue, 120.5 g., M.P. 197–199° C. (reported M.P. of sulfamic acid, 200–205° C.) assayed 85% sulfamic acid and 12% ammonium bisulfate.

EXAMPLE 6

A mixture of 96% sulfuric acid (18.9.; 0.18 mole), urea (13 g.; 0.22 mole), and caprolactam (10 g.; 0.089 mole) was prepared at a temperature of 120–125° C. The mixture was extracted with successive portions of refluxing chloroform to recover 7.8 g. (78%) of caprolactam, M.P. 61–65° C. The residue was heated under vacuum to remove all solvent, and was then added portionwise to 60 ml. of liquid sulfur trioxide while stirring at room temperature. The addition was carried out over 45 minutes, with the sulfur trioxide refluxing intermittently from the heat of reaction. Excess sulfur trioxide was removed by distillation and the residue was then heated at 125–130° C./15 mm. The crystalline residue was dried over sodium hydroxide to yield 48.7 g. of crude product, M.P. 185–187° C. There was no melting point depression on admixture with an authentic sample of sulfamic acid, M.P. 203–205° C.

EXAMPLE 7

A solution of 5 g. (0.044 mole) of caprolactam in 9.0 g. (0.088 mole) of 96% sulfuric acid was prepared at a temperature of about 120° C. After cooling to 45° C., 6.5 g. (0.108 mole) of urea was added. The resulting mixture, while maintained at a temperature of about 45° C., was added dropwise to 58 ml. of liquid sulfur trioxide. The sulfur trioxide was allowed to reflux under the heat of reaction while carrying out the addition. When the addition was complete, excess sulfur trioxide was removed by distillation followed by heating under reduced pressure (14–15 mm.) at 130° C. The dark, crystalline residue, consisting of crude sulfamic acid and caprolactam, was neutralized with concentrated ammonium hydroxide and extracted with chloroform. Evaporation of the extract yielded 1.2 g. (24%) of recovered caprolactam, M.P. 66–69° C.

This invention is also applicable to other Beckmann rearrangement catalysts such as polyphosphoric acid as demonstrated by the following examples.

EXAMPLE 8

Cyclohexanone oxime (20 g.; 0.173 mole) was rearranged in an equal weight of polyphosphoric acid by adding, dropwise, the oxime dissolved in 50 ml. of dichloroethane to a stirred dispersion of the polyphosphoric acid (20 g.; equivalent to 0.12 mole of $P_2O_5$) in 50 ml. of dichloroethane at a temperature of approximately 80–85° C. After stirring the reaction mixture at that temperature for approximately 30 minutes, 7.2 grams (0.12 mole) of urea was added while maintaining the temperature at about 80° C. After removal of the dichloroethane by distillation, the reaction mixture was distilled at 125–135° C./10 mm. Hg to yield 10 grams (50%) of caprolactam as a crystalline distillate.

EXAMPLE 9

The reaction of Example 8 was repeated, except that after addition of the urea, the dichloroethane was removed by distillation and the residue was extracted with ten 100 ml. portions of refluxing chloroform. Removal of the chloroform from the combined extracts gave 13.4 grams of caprolactam, M.P. 65–69° C., representing a 67% yield.

What is claimed is:

1. The process of recovering lactam from a Beckmann rearrangement reaction product mixture and converting the rearrangement catalyst to a valuable by-product which comprises adding urea to the reaction product mixture, and separating lactam from the reaction product mixture to produce a substantially lactam-free residue containing a reaction product of urea with the rearrangement catalyst.

2. The process of recovering lactam from a Beckmann rearrangement reaction product mixture and converting the rearrangement catalyst to a valuable by-product which comprises adding urea to the reaction product mixture, removing lactam from the reaction product mixture by subjecting the mixture to fractional distillation to produce a substantially lactam-free residue containing a reaction product of urea with the rearrangement catalyst.

3. The process of recovering lactam from a Beckmann rearrangement reaction product mixture and converting the rearrangement catalyst to a valuable by-product which comprises adding solid urea to the reaction product mixture, removing lactam from the reaction product mixture by subjecting the mixture to fractional distillation to produce a substantially lactam-free residue containing a reaction product of urea with the rearrangement catalyst.

4. The process of recovering epsilon-caprolactam from a Beckmann rearrangement reaction product mixture and converting the rearrangement catalyst to a valuable by-product which comprises adding solid urea to the reaction product mixture, and separating epsilon-caprolactam from the reaction product mixture to produce a substantially epsilon-caprolactam-free residue containing a reaction product of urea with the rearrangement catalyst.

5. The process of recovering epsilon-caprolactam from a cyclohexanone oxime-sulfuric acid Beckmann rearrangement reaction product mixture and converting the rearrangement catalyst to a valuable by-product which comprises adding urea to the reaction product mixture containing sulfuric acid and epsilon-caprolactam as a sulfuric acid salt in a ratio of at least 1 mole of urea per mole of sulfuric acid and removing epsilon-caprolactam from the reaction product mixture by subjecting the mixture to an epsilon-caprolactam separation process to produce a substantially epsilon-caprolactam-free residue containing a urea salt of sulfuric acid.

6. The process of recovering epsilon-caprolactam from a cyclohexanone oxime-sulfuric acid Beckmann rearrangement reaction product mixture and converting the rearrangement catalyst to a valuable by-product which comprises adding solid urea to the reaction product mixture containing sulfuric acid and epsilon-caprolactam as a sulfuric acid salt in a ratio of at least 1 mole of urea per mole of sulfuric acid and removing epsilon-caprolactam from the reaction product mixture by subjecting the mixture to an epsilon-caprolactam separation process to produce a substantially epsilon-caprolactam-free residue containing a urea salt of sulfuric acid.

7. The process of recovering epsilon-caprolactam from a cyclohexanone oxime-sulfuric acid Beckmann rearrangement reaction product mixture and converting the rearrangement catalyst to a valuable by-product which comprises adding solid urea to the reaction product mixture containing sulfuric acid and epsilon-caprolactam as a sulfuric acid salt, said urea being added in the ratio of at least one mole of urea to each mole of sulfuric acid present, removing epsilon-caprolactam from the reaction product mixture by subjecting the mixture to fractional distillation to produce a substantially epsilon-caprolactam-free residue containing a urea salt of sulfuric acid.

8. The process of recovering lactam from a Beckmann rearrangement reaction product mixture in which sulfuric acid has been the rearrangement catalyst and converting the rearrangement catalyst to a valuable by-product which comprises adding urea to the reaction product mixture containing sulfuric acid and lactam as a sulfuric acid salt in a ratio of at least 1 mole of urea per mole of sulfuric acid, removing lactam from the reaction product mixture by subjecting the mixture to fractional distillation to produce a substantially lactam-free residue containing a urea salt of sulfuric acid.

9. The process according to claim 8 in which solid urea is added to the mixture.

10. The process of recovering lactam from a Beckmann rearrangement reaction product mixture in which sulfuric acid has been the rearrangement catalyst and converting the rearrangement catalyst to a valuable by-product which comprises adding urea to the reaction product mixture containing sulfuric acid and lactam as a sulfuric acid salt in a ratio of at least 1 mole of urea per mole of sulfuric acid, separating lactam from the reaction product mixture to produce a substantially lactam-free residue containing a urea salt of sulfuric acid and treating the urea salt of sulfuric acid with sulfur trioxide to convert the salt to sulfamic acid.

11. The process of recovering epsilon-caprolactam from a Beckmann rearrangement reaction product mixture in which sulfuric acid has been the rearrangement catalyst and converting the rearrangement catalyst to a valuable by-product which comprises adding urea to a reaction product mixture containing sulfuric acid and epsilon-caprolactam as a sulfuric acid salt in a ratio of at least 1 mole of urea per mole of sulfuric acid, separating epsilon-caprolactam from the reaction product mixture to produce a substantially epsilon-caprolactam-free residue containing a urea salt of sulfuric acid and treating the urea salt of sulfuric acid with sulfur trioxide to convert the salt to sulfamic acid.

12. The process of recovering lactam from a Beckmann rearrangement reaction product mixture in which sulfuric acid has been the rearrangement catalyst and converting the rearrangement catalyst to a valuable by-product which comprises adding urea to the reaction product mixture containing sulfuric acid and lactam as a sulfuric acid salt in a ratio of at least 1 mole of urea per mole of sulfuric acid, treating the reaction mixture with sulfur trioxide to convert the urea salt of sulfuric acid to sulfamic acid, and separating the lactam from the reaction mixture to produce a substantially lactam-free residue containing sulfamic acid.

13. The process of recovering lactam from a Beckmann rearrangement reaction product mixture and converting the rearrangement catalyst to a valuable by-product which comprises adding urea to the reaction product mixture, removing lactam from the reaction product mixture by subjecting the mixture to extraction with an inert solvent to produce a substantially lactam-free residue containing a reaction product of urea with the arrangement catalyst.

14. The process of recovering lactam from a Beckmann rearrangement reaction product mixture and converting the rearrangement catalyst to a valuable by-product which comprises adding solid urea to the reaction product mixture, removing lactam from the reaction product mixture by subjecting the mixture to extraction with an inert solvent to produce a substantially lactam-free residue containing a reaction product of urea with the rearrangement catalyst.

15. The process of recovering epsilon-caprolactam from a cyclohexanone oxime-sulfuric acid Beckmann rearrangement reaction product mixture and converting the rearrangement catalyst to a valuable by-product which comprises adding solid urea to the reaction product mixture containing sulfuric acid and epsilon-caprolactam as a sulfuric acid salt, said urea being added in the ratio of at least one mole of urea to each mole of sulfuric acid present, removing epsilon-caprolactam from the reaction product mixture by subjecting the mixture to extraction with an inert solvent to produce a substantially epsilon-caprolactam-free residue containing a urea salt of sulfuric acid.

16. The process of recovering lactam from a Beckmann rearrangement reaction product mixture in which sulfuric acid has been the rearrangement catalyst and converting the rearrangement catalyst to a valuable by-product which comprises adding urea to the reaction product mixture containing sulfuric acid and lactam as a sulfuric acid salt in a ratio of at least 1 mole of urea per mole of sulfuric acid, removing lactam from the reaction product mixture by subjecting the mixture to extraction with an inert solvent to produce a substantially lactam-free residue containing a urea salt of sulfuric acid.

References Cited in the file of this patent
UNITED STATES PATENTS

| | | |
|---|---|---|
| 2,102,350 | Baumgarten | Dec. 14, 1937 |
| 2,436,658 | McQuaid | Feb. 24, 1948 |
| 2,605,261 | Kahr | July 29, 1952 |
| 2,883,337 | Schickh | Apr. 21, 1959 |

OTHER REFERENCES

Thorpe: "Dictionary of Applied Chemistry," 1916, vol. V, page 594; Longmans, Green & Co.

UNITED STATES PATENT OFFICE
CERTIFICATE OF CORRECTION

Patent No. 3,016,287　　　　　　　　　　　　　　　January 9, 1962

Thomas R. Hopkins et al.

It is hereby certified that error appears in the above numbered patent requiring correction and that the said Letters Patent should read as corrected below.

Column 4, line 14, for "18.9." read -- 18 g. --; column 6, lines 55 and 56, for "arrangement" read -- rearrangement --; column 8, line 9, for "2,883,337" read -- 2,883,377 --.

Signed and sealed this 1st day of May 1962.

(SEAL)
Attest:

ERNEST W. SWIDER
Attesting Officer

DAVID L. LADD
Commissioner of Patents